United States Patent [19]

Bibler

[11] 4,016,979

[45] Apr. 12, 1977

[54] LOG SORTING CONVEYOR

[75] Inventor: David R. Bibler, Russellville, Ark.

[73] Assignee: Bibler Brother, Inc., Russellville, Ark.

[22] Filed: Sept. 18, 1975

[21] Appl. No.: 614,657

[52] U.S. Cl. .............................. 209/74 R; 209/125; 198/370

[51] Int. Cl.[2] ........................................ B65G 21/00

[58] Field of Search ......... 209/74 R, 125; 214/768, 214/62 A; 298/18, 22 P; 105/270, 261 R; 198/27, 38, 155, 185, 370

[56] References Cited

UNITED STATES PATENTS

| | | | |
|---|---|---|---|
| 2,661,235 | 12/1953 | Isachsen | 298/18 |
| 2,862,240 | 12/1958 | Strauss | 18/30 |
| 3,348,678 | 10/1967 | Flowers | 209/74 R |
| 3,828,928 | 8/1974 | Roderick | 209/74 R |
| 3,923,157 | 12/1975 | Cavenar | 209/74 R X |

*Primary Examiner*—Drayton E. Hoffman
*Assistant Examiner*—Joseph J. Rolla
*Attorney, Agent, or Firm*—Giles C. Clegg, Jr.

[57] ABSTRACT

A conveyor for sorting logs is pivotably mounted on a support structure and is rotatable about an axis parallel to the direction of log transport. The apparatus includes double chamber pneumatic cylinders which may be selectively actuated to pivot the conveyor to dump logs therefrom to either side of the support structure. Limit switches on the conveyor are operatively connected in a control circuit arrangement to prevent the piston within the cylinders from reaching its limit of travel, thereby providing an air cushioned, shock absorber effect. The conveyor drive mechanism acts as a counterweight to return the conveyor to a level orientation.

10 Claims, 6 Drawing Figures

LOG SORTING CONVEYOR

BACKGROUND OF THE INVENTION

This invention relates to log conveying mechanisms and, more particularly, to apparatus for conveying and sorting logs.

In log processing centers, it is desired to sort logs according to different characteristics such as, for example, diameter, length, type of wood, suitability for lumber or paper pulp material, etc. In such a system, logs are placed end to end on a conveyor and are transported past a plurality of sorting stations. Such a system is disclosed, for example, in co-pending application Ser. No. 614,656, entitled "Method And Apparatus For Processing Logs", assigned to the assignee of this invention, filed on even date herewith. Heretofore, as a log passed a sorting station where it was desired to transfer the log from the conveyor belt to a stack, typical apparatus for performing such a function included a "log kicker" which pushed the log laterally off one side of the conveyor. In order to conserve space and reduce the cost associated with long conveyor lines, it would be desirable to have apparatus capable of displacing logs to either side of the conveyor.

SUMMARY OF THE INVENTION

In accordance with the principles of this invention, apparatus is provided for conveying and sorting logs. A conveyor frame is pivotably mounted on a support structure, the pivot axis being parallel to the direction of movement of the conveyor belt. Double chamber pneumatic cylinders are actuated selectively to pivot the conveyor to one side or the other a sufficient angular amount to cause a log on the conveyor to roll laterally thereoff. Limit switches mounted on the apparatus are actuated when the conveyor has rotated to a particular point, terminating the actuation of the cylinders. The conveyor drive mechanism is mounted below the conveyor pivot point to act as a counterweight to return the conveyor to its level position after the log is displaced. The limit switches are positioned to be actuated before the limit of travel of the piston within the pneumatic cylinder is reached, the cylinders thereby acting as shock absorbers.

DESCRIPTION OF THE DRAWING

The foregoing will be more readily apparent upon reading the following description in conjunction with the drawing in which.

DESCRIPTION OF THE PREFERRED EMBODIMENT

Figure 1:
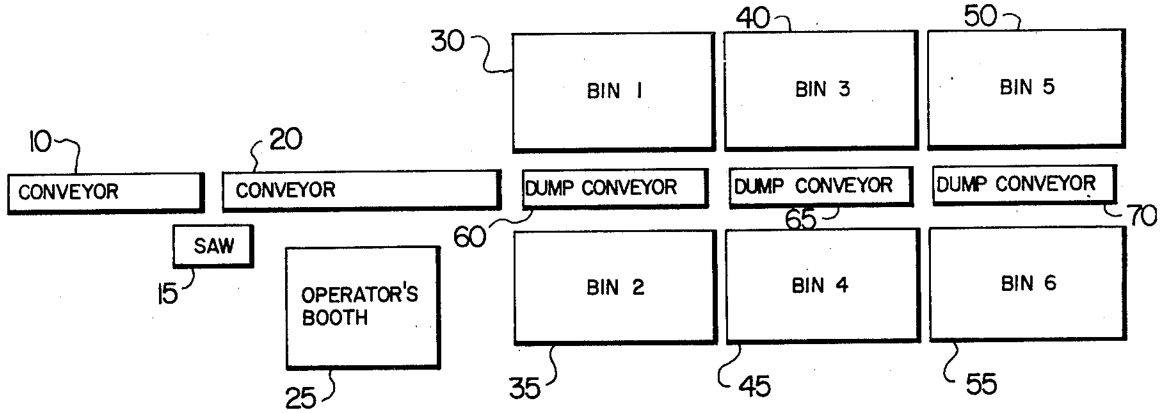
FIG. 1 depicts a schematic plan view of a log conveying and sorting system in which the apparatus of the present invention finds particular utility.

Referring now to FIG. 1, shown therein is a schematic plan view of a log conveying and sorting system of the type described in the aforementioned co-pending application. In the illustrative system, logs travel from left to right, entering on conveyor 10. The logs are cut to length by saw 15 and the cut lengths of log then travel along conveyor 20. An operator in booth 25 examines the logs on conveyor 20 and determines into which of bins 30, 35, 40, 45, 50, and 55 the logs are to be sorted. This determination may be based upon any of several factors, such as log diameter, log length, or type of wood, depending upon the particular application. The logs from conveyor 20 are transported to conveyor 60, a conveyor of the type according to this invention which will be described in greater detail hereinafter. If the operator in booth 25 has determined that the particular log is to be sorted into bin 30 or bin 35, the operator closes the respective switch and conveyor 60 pivots in the proper direction to roll the log thereoff into the selected bin. If the particular log is not to go into bin 30 or 35, it is transported to conveyor 65, another conveyor constructed in accordance with the principles of this invention. If the operator determines that the log on conveyor 65 is to go into bin 40 or 45, the proper switch is activated to cause conveyor 65 to pivot and roll the log thereoff into the proper bin. If the log is not to go into bin 40 or 45, the log is transported to conveyor 70. The operator in booth 25 then activates the proper switch to cause conveyor 70 to pivot and roll the log thereoff into either bin 50 or 55. In the illustrative system of FIG. 1 six bins are shown. It is contemplated that the system may be reduced or expanded to any number of bins, each pair of bins having therebetween a conveyor of the type constructed in accordance with the principles of this invention.

Figure 2:
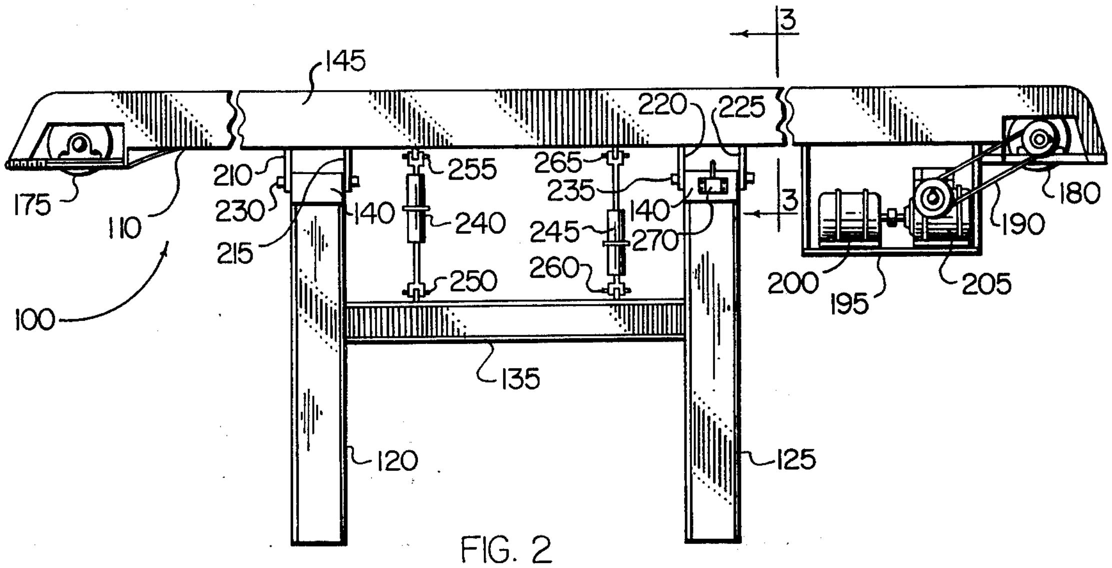
FIG. 2 depicts a side view of an illustrative conveyor constructed in accordance with the principles of this invention.
Figure 3:
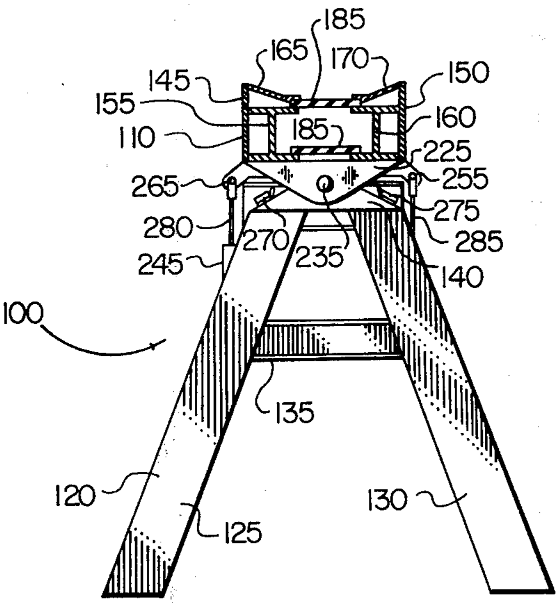
FIG. 3 depicts a cross-sectional view of the conveyor structure taken along the line 3—3 of FIG. 2.

Referring now to FIGS. 2 and 3, shown therein are views of an illustrative conveyor 100 constructed in accordance with the principles of this invention which may be utilized as any of the conveyors 60, 65 or 70 of FIG. 1. Conveyor 100 includes a conveyor frame 110 mounted on a support structure 120. Support structure 120 includes a pair of spaced apart support frames, each of the frames including a pair of oppositely inclined beams 125 and 130. Support structure 120 also includes a platform 135 mounted between the support frames. The inclined beams 125 and 130 are joined at their upper ends by a member 140 which serves to provide a pivot point, as will be described more fully hereinafter. The inclined beams 125 and 130 provide the dual function of supporting the conveyor apparatus and guiding logs which are dumped into the appropriate bin.

Conveyor frame 110 includes side members 145 and 150, beams 155 and 160, and through forming members 165 and 170, arranged as shown in FIG. 3. Conveyor frame 110 also includes drive rollers 175 and 180, around which is looped endless conveyor belt 185. A belt of PVC or similar abrasion resistant belting has been found satisfactory for use in a conveyor handling relatively small logs up to 7 - 10 inches in diameter. It has been discovered that box chain of the type frequently used for conveying sawdust and similar fungible materials is best suited for use when large logs are to be handled. The drive rollers may be smooth when belting is used, but include projections to engage the box chain when it is utilized. When the box chain is utilized, it is preferred that I beams 155 and 160 be disposed as shown in FIG. 3 with the ends of the beams acting as rails. Loose material such as bark can fall through. On the other hand, if belting is used it is desirable that the upper run of the conveyor be over a substantially solid floor. Mounted below conveyor frame 110 and coupled to roller 180 through drive belt 190 is conveyor drive mechanism 195 which includes a conventional motor 200 and transmission 205. To pivotably connect conveyor frame 110 to support structure 120, triangular shaped members 210, 215, 220 and 225 are mounted on the bottom of beams 155 and 160. Openings are provided through triangular plate members 210, 215, 220 and 225 near the apex opposite the side mounted to conveyor frame 110. These openings correspond to openings through members 140 on support structure 120. Through these openings are passed pins 230 and 235. These pins 230 and 235 serve a dual function; they connect conveyor frame 110 to support structure 120 and provide a pivot axis for conveyor frame 110.

Conveyor frame 110 is also connected to support structure 120 through double chamber pneumatic cylinders 240 and 245. Cylinders 240 and 245 are pivotably connected to conveyor frame 110 and support structure 120 by means of pins 250, 255, 260 and 265. It is thus seen that if it is ever necessary to make repairs to conveyor frame 110, it is a simple matter to remove conveyor frame 110 from support structure 120. All that need be done is remove four pins; pins 230, 235, 255 and 265.

Mounted on support structure 120 are limit switches 270 and 275. These limit switches are connected in a control circuit arrangement, in a manner to be described hereinafter, so that the pistons within cylinders 240 and 245 do not reach their limit of travel when pivoting conveyor frame 110. This provides a cushion of air within the cylinders to act as a shock absorber when conveyor frame 110 is pivoted.

Figure 4A:
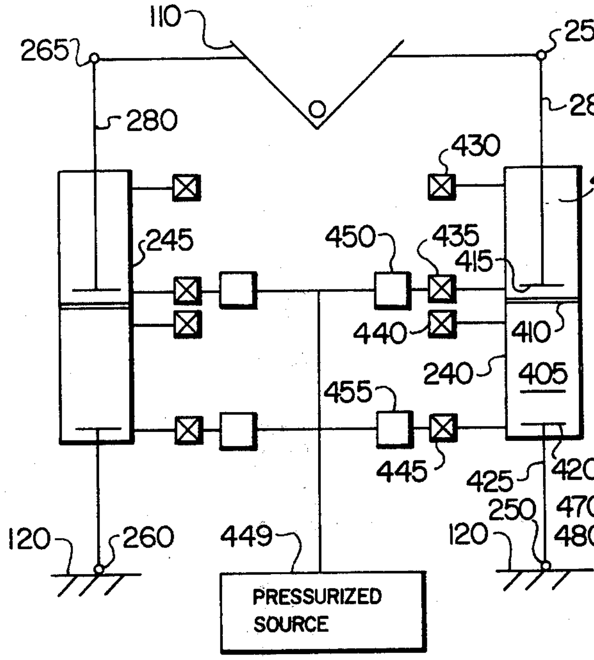
FIG. 4A and 4B depict schematic diagrams illustrating the operation of the pneumatic cylinders of the apparatus of FIG. 2.
Figure 4B:
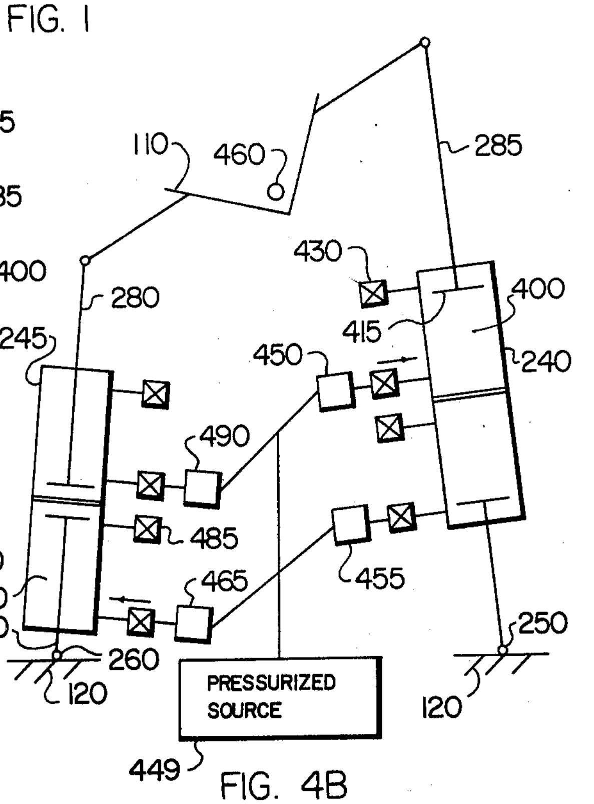

Referring to FIGS. 4A and 4B, the dumping action of the conveyor apparatus according to this invention will be described. FIG. 4A schematically depicts conveyor frame 110 connected to support structure 120 through double acting pneumatic cylinders 240 and 245 in its initial level position. It will be noted that one such cylinder will be sufficient for conveyors handling only small logs of up to 7 – 10 inches in diameter. FIG. 4B schematically depicts the apparatus of FIG. 4A where conveyor frame 110 has been counterclockwise pivoted. Pneumatic cylinder 240 comprises a pair of chambers 400 and 405 separated by a wall 410, a piston head 415 in chamber 400 connected to rod 285 and a piston head 420 in chamber 405 connected to rod 425. Cylinder 240 has four air lines connected thereto, one at each end of the chambers 400 and 405. These air lines are connected to flow control valves 430, 435, 440 and 445. The air lines provide for the control of the movement of the piston heads within the respective chambers. The flow control valves allow air to freely enter the respective chamber but restrict the flow of air leaving the chamber. It has been found particularly desirable to utilize adjustable flow control valves wherein the amount of air pressure in the chambers which is necessary before air may leave the chamber may be set into the valve. Flow control valves 430 and 440 are connected to the atmosphere while control valves 435 and 445 are connected to source 449 of pressurized air through solenoid valves 450 and 455, respectively. When conveyor frame 110 is in its level position as shown in FIG. 4A, piston heads 415 and 420 are near the lower ends of their respective chambers, and there is no flow of air into or out of the chambers. The arrangement for cylinder 245 is identical to that described for cylinder 240.

FIG. 4B schematically depicts conveyor frame 110 being pivoted about point 460 in a counterclockwise direction. When it is desired to pivot conveyor frame 110 in a counterclockwise direction, the operator in booth 25 (FIG. 1) depresses the appropriate switch which energizes solenoid valve 450 to allow pressurized air to enter the lower end of chamber 400 of cylinder 240. At the same time, solenoid valve 465 is energized to allow pressurized air to enter the lower end of chamber 470 of cylinder 245. The air entering chamber 400 causes piston head 415 to push rod 285 up and the air entering chamber 470 causes cylinder 245 to be pulled down, since piston head 475 is firmly attached to support structure 120 through rod 480 and cannot move. As no air is entering the remaining two chambers, the piston heads therein do not change their relative positions. As air enters the lower portions of chambers 400 and 470, air leaves the upper portions of these chambers in a restricted manner through flow control valve 430 and 485, thereby cushioning the motion of conveyor frame 110. After conveyor frame 110 has pivoted a predetermined amount, limit switch 270 (FIG. 3) is activated. This causes the de-energization of solenoid valves 450 and 465. However, the inertia generated by the log being dumped from conveyor 110 causes the conveyor to continue pivoting until the log has left the frame. At this point, the conveyor drive mechanism 195 which is below the pivot point 460 of conveyor frame 110 acts as a counterweight and causes conveyor frame 110 to return to its initial level position by pivoting clockwise from the position depicted in FIG. 4B. Since flow control valves 445 and 485 restrict the flow of air out of the cylinder chambers 400 and 470, respectively, a damping, or shock absorber, effect is achieved when conveyor frame 110 returns to its initial level position.

When it is desired to pivot conveyor frame 110 from the level position depicted in FIG. 4A in a clockwise manner, the operator in booth 25 pushes a different button which causes air to enter to other chambers of cylinders 240 and 245 through solenoid valves 455 and 490, the operation in this mode being analogous to that described above.

Figure 5:
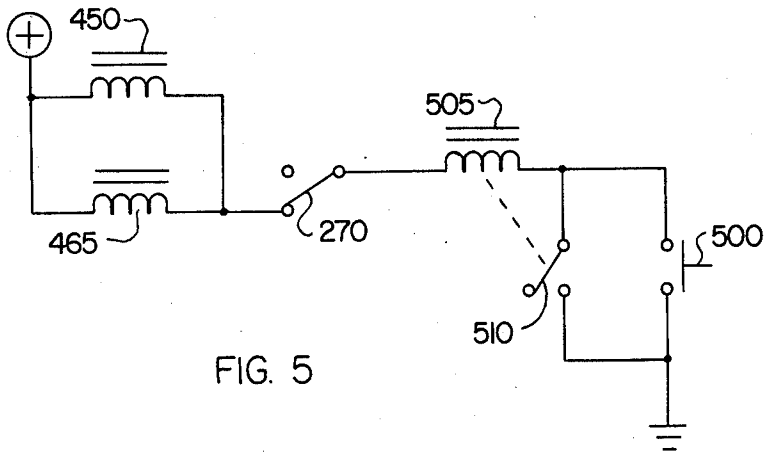
FIG. 5 depicts a schematic diagram of an illustrative control circuit for operating the apparatus according to this invention.

FIG. 5 depicts a schematic diagram of an illustrative control circuit for the counterclockwise pivoting of the apparatus according to this invention. An identical circuit may be similarly provided for clockwise pivoting. When it is desired to counterclockwise pivot conveyor frame 110, push button 500 in operator's booth 25 is depressed. This energizes solenoids 450 and 465, allowing pressurized air to enter chambers 400 and 470, respectively, as described above. Relay 505 is also energized, closing it normally open contact 510. Push button 500 may then be released. when conveyor frame 110 pivots the desired amount, the normally closed contact of limit switch 270 opens terminating the energization of solenoids 450 and 465 and allowing the counterweight effect of the conveyor drive mechanism to return conveyor frame 110 to its level position.

It will be noted that the logs being sorted typically weigh in excess of 1000 pounds, and once dumping is initiated the weight of the log will cause the dumping operation to proceed until the log falls from the conveyor. The holding relay 505 is therefore not essential. It is considered desirable to provide the limit switches even if the relay 505 is not utilized to prevent damage to the apparatus if the operator should inadvertently cause air pressure to be supplied for an excessive period of time.

Whereas this invention has been described with respect to a single embodiment thereof, it is understood that a person of skill in the art may make modifications thereto without departing from the spirit and scope of the invention.

What is claimed is:

1. Apparatus for sorting logs to either side of a central transport path comprising:

conveyor means for transporting logs along said path, said conveyor means including a conveyor frame, an endless conveyor supported by said conveyor frame, drive means for driving said endless conveyor mounted on and below said conveyor frame and side members extending upward and outward from said endless conveyor to define a through preventing lateral displacement of logs being transported;

a support structure including means defining at least one central pivot point for connection to said conveyor frame, said pivot point being above the level of said drive means;

connecting means for connecting said conveyor means to said support structure at said pivot point, said connecting means including first pin means providing a pivot axis for said conveyor means;

pneumatic cylinder means connected between said conveyor means and said support structure effective when actuated for selectively causing said conveyor means to pivot about said axis; and control means operable to cause the elective actuation of said pneumatic cylinder means to cause said conveyor means to be pivoted sufficiently to cause a log carried by said conveyor means to roll out of said trough to a selected side, said drive means acting as a counterweight to then cause said conveyor means to be returned to an initial level orientation.

2. The apparatus of claim 1 wherein said control means includes limit switch means associated with said conveyor means and responsive to a predetermined amount of pivoting of said conveyor means for providing a signal to terminate the actuation of said cylinder means.

3. The apparatus of claim 1 wherein said first pin means is removable and said apparatus further includes removable second pin means connecting said pneumatic cylinder means to said conveyor means, whereby said conveyor means including said drive means is removably connected to said support structure by only said first and second pin means.

4. The apparatus of claim 1 wherein said pneumatic cylinder means includes:

a pneumatic cylinder having a first chamber and a second chamber;

a first piston inside said first chamber;

a second piston inside said second chamber;

a first rod extending out from said first chamber and connected to said first piston and said conveyor means;

a second rod extending out from said second chamber and connected to said second piston and said support structure;

four air lines entering the end regions of said chambers, two of said air lines entering each of said chambers and separated by the piston in that chamber;

four flow control valves, each of said valves connected to a respective one of said air lines and adapted to allow air to freely enter the respective chamber and to restrict the flow of air from the respective chamber;

first valve means actuatable by said control means and connected to the air line entering the first chamber opposite the end of the first chamber through which extends the first rod;

second valve means actuatable by said control means and connected to the air line entering the second chamber at the end of the second chamber through which extends the second rod; and a pressurized pneumatic source connected to said first and second valve means.

5. The apparatus of claim 4 wherein said flow control valves each are adjustable to retain a predetermined amount of pressure within their respective chamber before allowing the restricted flow of air from the respective chamber.

6. Log sorting apparatus comprising:

a conveyor having a length related to the length of logs to be sorted, said conveyor including a conveyor frame, an endless conveyor supported by said conveyor frame, drive means for driving said endless conveyor mounted on and beneath said conveyor frame and side members extending upward and outward from said endless conveyor to define a trough along which logs being sorted move with said side members preventing lateral displacement of logs being moved;

bin means positioned on each side of said conveyor for receiving logs which have been sorted;

at least two spaced apart support frames, each including a pair of oppositely inclined beams connected at their upper ends to form a pivot point above the level of said drive means;

first pin means pivotably connecting said conveyor to each of said support frames at said pivot points with said support frames supporting said conveyor above said bin means and said inclined beams guiding sorted logs into said bin means;

pneumatic cylinder means connected to said conveyor effective when actuated to selectively cause said conveyor to pivot toward one of said bin means sufficiently to cause a log carried by the conveyor to roll out of the conveyor and be directed by said inclined beams to said bin means;

control means operable to cause said selected actuation of said pneumatic cylinder means; and limit switch means associated with said conveyor and responsive to a predetermined amount of pivotal movement of the conveyor for causing said control means to terminate the actuation of said pneumatic cylinder means, said drive means acting as a counterweight to return the conveyor to a normal level position.

7. The log sorting apparatus of claim 6 wherein said first pin means is removable and said log sorting apparatus further includes removable second pin means connecting said pneumatic cylinder means to said conveyor, whereby said conveyor including said drive means is removably connected to said support frames by only said first and second pin means.

8. The log sorting apparatus of claim 6 wherein said endles conveyor comprises a box chain.

9. The apparatus of claim 6 wherein said pneumatic cylinder means includes:

a pneumatic cylinder having a first chamber and a second chamber;

a first piston inside aid first chamber;

a second piston inside said second chamber;

a first rod extending out from said first chamber and connected to said first piston and said conveyor means;

a second rod extending out from said second chamber and connected to said second piston and said support structure;

four air lines entering the end regions of said chambers, two of said air lines entering each of said chambers and separated by the piston in that chamber;

four flow control valves, each of said valves connected to a respective one of said air lines and adapted to allow air to freely enter the respective chamber and to restrict the flow of air from the respective chamber;

first valve means actuatable by said control means and connected to the air line entering the first chamber opposite the end of the first chamber through which extends the first rod;

second valve means actuatable by said control means and connected to the air line entering the second chamber at the end of the second chamber through which extends the second rod; and a pressurized pneumatic source connected to said first and second valve means.

10. The apparatus of claim 9 wherein said flow control valves each are adjustable to retain a predetermined amount of pressure within their respective chamber before allowing the restricted flow of air from the respective chamber.

* * * * *